March 22, 1932.                O. V. GREENE                1,850,101
                              FILTER MECHANISM
                            Filed May 4, 1929        2 Sheets-Sheet 1
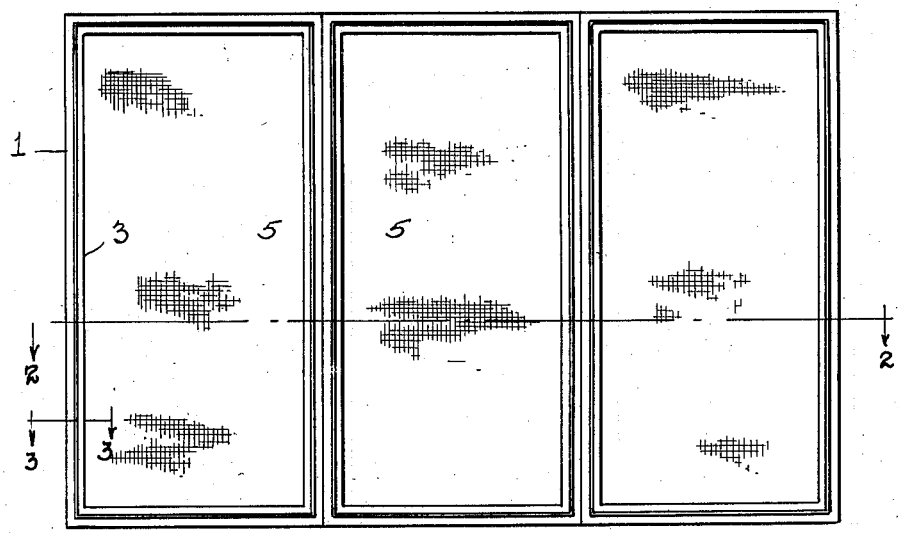
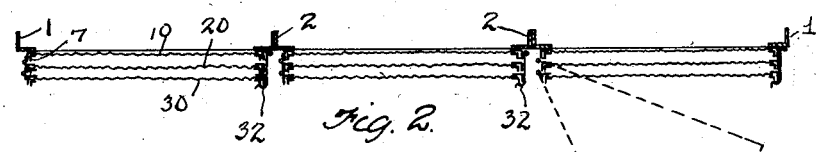
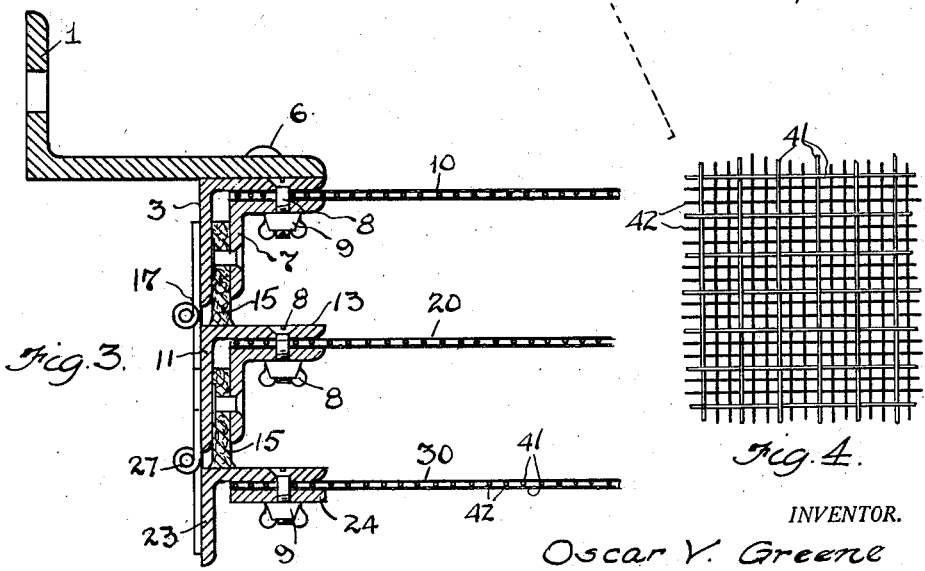
INVENTOR.
Oscar V. Greene
BY
Fay, Oberlin & Fay
ATTORNEYS.

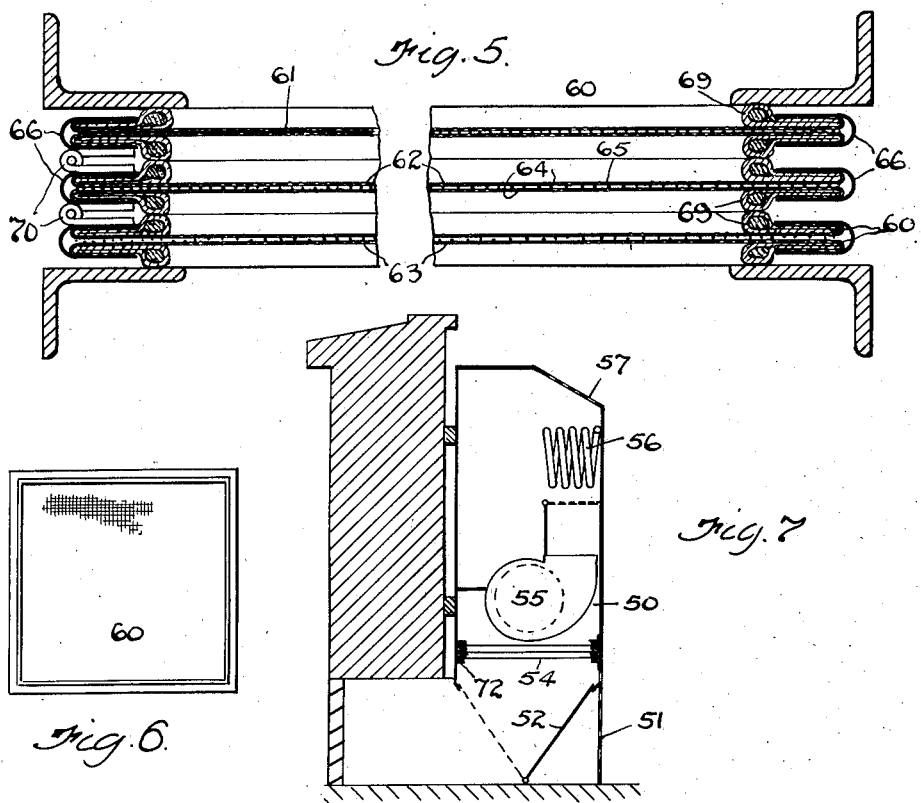

Patented Mar. 22, 1932

1,850,101

UNITED STATES PATENT OFFICE

OSCAR V. GREENE, OF CLEVELAND, OHIO

FILTER MECHANISM

Application filed May 4, 1929. Serial No. 360,411.

The present invention relates to air filters, and more particularly to a filter of the dry type which comprises means for holding the separate filtering elements in such a manner that they may be separated from each other and easily cleaned without removal from the supporting frame. Another feature is the manner of mounting the filter so that the individual elements are removable for replacement. The method of sealing the edges of the filter so as to prevent air seepage is another feature of the invention.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:

Fig. 1 is a front elevational view of a filter bank; Fig. 2 is a sectional view on the line 2—2 of Fig. 1; Fig. 3 is an enlarged sectional view on the line 3—3 of Fig. 1; Fig. 4 is a plan view of a portion of one of the filter elements; Fig. 5 is a sectional view through a modified form of filter element; Fig. 6 is a plan view of the element shown in Fig. 5; and Fig. 7 is a sectional view through a unit heater mechanism showing the manner of installing a filter of the type shown in Figs. 5 and 6.

The present filter is of the dry type, that is a filter which provides a filtering medium which is not adapted to be coated with oil or the like, and, as shown in Fig. 1, such filters, where installed in the usual building, are arranged side by side and built to suit ceiling height of air chamber, the number of course varying with the amount of air which it is necessary to handle. In such a mounting there is a framework 1 formed of angle irons which is secured to the building wall, these angle irons being formed around each filter section, the angles of adjacent sections being secured together to form T-angles 2 when the units are in place. Each filter unit proper consists of series of spaced elements 5 each having an angle iron frame 3. The frame of the inner or exhaust side element is secured to the main frame 1 by means of rivets 6 or the like, the filter element itself 10 being placed against the outer surface of one face of the frame 3 and being held thereagainst by means of a second angle iron frame 7 which is secured thereto by bolts 8 and nuts 9 so as to clamp the filter element 10 securely between the two faces of the angle iron frames 3 and 7, the other sides 11 and 12 being spaced apart, and the outer frame 7 being provided with a felt or similar packing strip 15 which is riveted thereto and which when the filter is in position, is forced tightly against the face of the inner frame 3 to make a satisfactory air seal at the sides, top and bottom of the frame.

This so-called fixed frame 3 has mounted at one side hinges 17 which carry the next so-called fixed frame 13 for the second filter element, the element 20 itself being secured to this angle iron frame in the same manner as is the inner element. As shown, the present filter comprises three filter elements 10, 20 and 30 spaced apart, the third or intake side element also being carried by a fixed angle iron frame 23, the element in this case being secured thereto by a frame, flat strips or a band 24 which are held against the element by bolts 8 and nuts 9. This third outer angle iron frame 13 and its associated element 30 are pivotally mounted by hinges 27 which are secured to the second and third fixed frames 13 and 23. To lock the elements in their sealed position there is mounted on the main frame 1 a series of latch members 32 which are sprung over the frame members so as to latch them into their sealing position, as best shown in Fig. 2.

The element is preferably cleaned by the use of a vacuum cleaner which is passed over the front surface of the element, thus sucking the dirt from the element, and as the front element or intake 30 is cleaned the latch members are released and the front element swung back into the position shown in dotted lines in Fig. 2, at which point the intermediate element 20 may be subjected to the same cleaning action, and then swung outwardly as shown in Fig. 2, leaving the inner or exhaust side element 30 free so that it can be cleaned in the same manner. In this way the filter is susceptible of careful and thorough cleaning, the individual elements themselves being cleaned separately, and these elements are preferably formed of two sheets of heavy coarse meshed wire screen 41, between which is mounted a sheet of filter cloth 42, the outer screens acting as guards and also as a supporting medium for the cloth which in itself merely acts as a filtering medium and does not have to take any of the force or wear from the air stream.

In Figs. 5, 6 and 7 the same type of filter is shown as applied to a unit heater, these unit heaters consisting of a casing 50 with an air inlet opening 51 at the bottom which is controlled by a damper 52, the air thence passing up through the filter unit 54, above which is mounted the suction fan or blower 55, which in turn forces the air up and past the heating coil or radiator 56, and then upwardly through the exhaust opening 57 in the top of the heater casing. This filter inlet 60, as best illustrated in Fig. 5, consists of three individual filter elements 61, 62 and 63 of the same type as those shown in the previous construction, namely, consisting of two armoring sheets 64 of heavy screen with an intermediate sheet 65 of filter cloth. Each of these elements is provided with a U-shaped frame 66, there being interposed between the frame and the element on each side of the U, a strip 60 of felt or other sealing material which has an enlarged rib 69 adjacent the frame, these sealing strips being adapted to contact with each other when the elements are together to form an air-tight seal around the edges of the filter unit. As illustrated, at one side, the U-strips of the three elements are hinged together as at 70 so that the elements may be opened up and cleaned with a vacuum cleaner in the same manner as for the large elements previously described. In this type of heater the filter unit is removable by sliding it into and out of a properly formed framework 72 mounted in the unit heater housing, this framework being preferably two sets of angle irons of sufficient depth to allow the outer felt strips to contact and engage with the angles so as to seal the unit in place in the housing. In this case the unit is merely slid into and out of these angle frames like a drawer.

The present type of filter construction, in which there are a series of spaced filtering elements, which may be separated for the purpose of cleaning, affords a very efficient and easily operated filter which may be varied within wide limits to meet different dust conditions. The number of individual spaced elements in the filter may be varied as necessary and yet provide for easy cleaning of each individual element. The stationary form, such as shown in the first several figures, is easily built and handled in large units from the standpoint of erection as it provides a rigid angle iron foundation or supporting frame to which the several elements themselves may be hinged, whereas in the small or unit type of heater the filter elements are easily removable, and cleanable when removed, and new elements may be substituted if necessary. In the large installation type the individual elements themselves are readily removable and interchangeable if any element becomes damaged or needs to be replaced for any reason. In addition, each element is constructed with its own means for sealing it in place against the frame and against the next element so that there is no air seepage or bypassing around the elements, and thus all of the air must pass through the filter elements in sequence.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A filter of the character described comprising a series of filter elements arranged in spaced relationship superposed on one another, each of said elements consisting of a layer of porous non-metallic material joined to a layer of reticulated metallic material and a narrow reinforcing frame attached to the outer edges of said layers, means adapted to hingedly attach said elements to each other, and other resilient means adapted to seal the joint between said elements along the edges of said frames.

2. The combination of an air passageway and a filter obstructing said passageway, said filter comprising several laminæ of filtering material spaced in superposed relationship, each of said laminæ being hingedly attached to the other in sequence, and means adapted to seal the periphery of each of said laminæ against the other.

3. An air filter consisting of a main frame, a filter element frame carrying a filter medium hinged thereto, a second filter element frame carrying a filter medium hinged to said first element frame, and means for locking said element frames together and to said main frame.

4. An air filter consisting of a main frame, a filter element frame carrying a filter medium hinged thereto, a second filter element frame carrying a filter medium hinged to said first element frame, and sealing means carried by said element frames for sealing them to each other and to said main frame.

5. A filter of the class described, consisting of a series of rectangular frames carrying filter material, said frames being hinged together and adapted to open and close in book-like manner, sealing strips mounted on the sides of certain of said frames to form airtight seals with the other of said frames in closed position.

6. An air filter consisting of a frame, a filter element frame carrying filter material rigidly secured thereto, a second filter element frame carrying filter material hinged to said first frame, a sealing strip carried by said first frame and adapted to engage with said second frame in closed position to seal said frames, and means to lock said frames in closed position.

7. An air filter consisting of a frame, a filter element frame carrying filter material rigidly secured thereto, and a plurality of other filter element frames each carrying a filter medium, said other frames being hinged to each other and to said first frame, a sealing strip mounted between each two filter element frames and carried by a frame and adapted to engage with the adjacent frame in the closed position of said filter to form an air seal between frames, and means for locking said frames in closed position.

8. An air filter comprising a stationary frame, a filter element frame hingedly attached to said stationary frame and carrying a filter element removably secured thereto, said filter element consisting of two sheets of metallic foraminous material, and a sheet of non-metallic fabric interposed therebetween and in close contactual relationship therewith, and resilient means adapted to seal the joint between said frames along the edges when in closed relation.

9. An air filter comprising a stationary supporting frame, a plurality of filter element frames hinged to said supporting frame and to each other, filter elements mounted in said hinged frame comprising a sheet of non-metallic foraminous material secured in close contactual relation between two sheets of metallic foraminous material, resilient means cooperating with said filter element frames adapted to seal the joints therebetween, and operative means adapted to lock said hinged frames together and to said stationary frame.

10. An air filter comprising a stationary rectangular supporting frame, a plurality of movable rectangular frames of approximately corresponding opening dimensions and register hinged to said stationary frame and to each other, foraminous elements mounted in said frames comprising a sheet of open woven cloth fabric secured in close contactual relation between two sheets of reticulated metallic material, resilient strips attached to said movable frames and adapted to seal the joints therebetween, and operative means adapted to fasten said movable frames together and to said stationary frames.

Signed by me, this 3rd day of May, 1929.

OSCAR V. GREENE.